March 5, 1935.          R. S. NELSON          1,993,379

ABSORPTION REFRIGERATING APPARATUS

Filed July 17, 1933

Inventor:
Rudolph S. Nelson.
By Harry S. Demaree, Atty.

Patented Mar. 5, 1935

1,993,379

UNITED STATES PATENT OFFICE 1,993,379

ABSORPTION REFRIGERATING APPARATUS

Rudolph S. Nelson, Rockford, Ill., assignor to The Hoover Company, North Canton, Ohio, a corporation of Ohio Application July 17, 1933, Serial No. 680,752

11 Claims. (Cl. 261—21)

This invention relates to continuous absorption refrigerating apparatus and more particularly to the construction of the absorber thereof.

In my co-pending application Serial No. 680,749 filed July 17, 1933, various types of absorbers are shown and described. The claims in the aforesaid application are generic to the construction shown and described in this application.

It is an object of the present invention to provide an absorber for a continuous absorption refrigerating system which will permit the absorption liquid to reach a high degree of concentration before it leaves the absorber.

It is another object of the invention to provide an absorber for a continuous absorption refrigerating system using an inert gas and in which the inert gas circulates through the absorber in such a way that the refrigerant gas carried from the evaporator to the absorber will be to a large extent absorbed before the inert gas leaves the absorber.

Another object of the invention is to provide an absorber which will permit of compact assembly in a small space and one which is suitable for use in an air cooled refrigerating unit.

Other objects and advantages reside in certain novel features of the arrangement and construction of parts as will be apparent from a consideration of the following description, taken in connection with the accompanying drawing in which:

Figure 1 is a diagrammatic representation of an absorption refrigerating system in which the absorber is constructed in accordance with the principles of the present invention.

Figure 2 is a cross-sectional view of the absorber diagrammatically illustrated in Figure 1;

Figure 3 is a view in elevation of a modified form of an absorber constructed in accordance with the principles of the invention, and Figure 4 is a view in elevation of an absorber which constitutes a still further modification of the invention.

Referring first to Figure 1 an absorption refrigerating system is shown as consisting of a boiler B, a gas separating chamber S, a condenser C, an evaporator E and an absorber A, these parts being connected by suitable conduits for forming a complete refrigerting system. The boiler is connected to the gas separating chamber by means of a small conduit 11, which functions as a gas lift pump in accordance with well-known principles, and conveys both gas and absorption liquid from the boiler B into the separator S. The refrigerant gas passes upwardly across the baffle plates in the upper part of the gas separating chamber S and through a conduit 12 into the condenser C where it condenses and flows into the evaporator E. Absorption liquid is conveyed out of the bottom of the gas separating chamber S through the conduit 13 into the top of the absorber A where it trickles down over the baffle plates therein and flows back to the boiler through the conduit 14. The conduits 13 and 14 are in heat exchange relation as indicated at 15. Inert gas is circulated between the evaporator and the absorber by means of the conduits 16 and 17 which are in heat exchange relation as indicated at 18.

It will be understood to those skilled in the art that the system shown in Figure 1 may be charged with ammonia as refrigerant, water as absorption liquid and hydrogen as the inert gas. The refrigerant will pass through a cycle from the boiler B through the conduit 11, gas separating chamber S, conduit 12, condenser C, evaporator E, conduit 17, absorber A, conduit 14 back to the boiler. The absorption liquid will pass through a cycle from the boiler B, through the conduit 11, gas separating chamber S, conduit 13, absorber A and conduit 14 back to the boiler. The inert gas will pass through a cycle from the evaporator E, through the conduit 17 into the absorber and after passing through this vessel in a manner presently to be described, will pass through the conduit 16 back to the evaporator.

Referring now to Figure 2, which shows the construction of the absorber in detail, it will be seen that a vertically extending cylinder is provided as indicated at 20, and that this cylinder is divided into two parts, designated 21 and 22, by means of a horizontally extending disc or partition 23. The upper compartment 21 contains a number of baffles or plates 24 arranged in staggered relation and which are adapted to retain an absorption liquid thereon, exposed to the gases in the compartment. Likewise the lower compartment 22 is provided with a number of baffle plates 25 also arranged in staggered relation and adapted to operate like baffles 24.

Located centrally of the lower compartment 22 is a vertical tube 26, which extends from the lowermost baffle 25 up through all the other baffle plates and through the disc 23 into the upper compartment 21.

The conduit 13 which supplies absorption liquid to the absorber is connected to the cylinder 20 at the upper part of the chamber 21 so that absorption liquid may trickle down over the baffle plates 24 therein under the influence of gravity.

As the liquid collects on the partition member 23 it is conveyed into the lower compartment 22 by means of a small conduit 27 bent into the form of a U so as to act as a trap. The absorption liquid may pass from the conduit 27 across the baffle plates 25 and collect in the bottom of the cylinder 20 and be conveyed away from the absorber through the conduit 14.

As noted above, inert gas and refrigerant gas are supplied to the absorber through the conduit 17 which is connected to the top of the lower compartment 22 of the absorber. The gases pass across the baffle plates 25 to the bottom of the compartment 22 and thence upwardly through the tubes 26 into the upper compartment 21. After passing across the baffle plates 24 in this compartment the inert gas is carried back to the evaporator through the conduit 16. In passing across the baffle plate 25 in the compartment 22, the gases entering through the conduit 17 will first come in contact with the absorption liquid on upper plates 25 and the greater amount of absorption will take place at this point. This absorption will, of course, be accompanied by the generation of the large amount of heat so that this point will become the hottest point in the absorber. As the absorption liquid trickles downwardly over the lower baffle plates it will gradually become cooled so that as it flows across the lowest of the baffle plates 25, it will have reached a temperature not very far above that of the cooling medium and will be capable of taking up additional refrigerant gas. Thus, by the time it reaches the bottom of the vessel 20, it has attained a high degree of concentration.

Likewise the inert gas is cooled as it passes downwardly from the region around the two upper baffle plates 25 of the lower compartment 22. Therefore, it is at a fairly low temperature as it passes through the tube 26 and enters the compartment 21. In flowing across the baffle plates 24 in the upper compartment 21 the inert gas gives up still more refrigerant gas to the absorption liquid due to the cooling process and also due to the fact that in the compartment 21 it comes in contact with the weakest absorption liquid, this liquid being supplied through the conduit 13. Thus the inert gas leaving the absorber through the conduit 16 has been effectively deprived of the refrigerant.

In the embodiment of the invention shown in Figure 2 the absorber is shown as being entirely air-cooled. Vertically disposed heat radiation fins are provided upon the cylinder 20 adjacent the lower compartment 22 as indicated at 30, while horizontally extending fins are shown around the upper part of the compartment 21 as indicated at 31, these fins being provided with downwardly inclined portions on one side as indicated at 32 and upwardly inclined portions on the other side as indicated at 33. It is, of course, within the purview of the invention to provide other means for cooling the absorber, and it is especially contemplated to employ an indirect cooling system of the type disclosed in the copending application of Rudolph S. Nelson, Serial No. 539,450 filed May 23, 1931, for cooling the portion of the cylinder 20 which forms the compartment 22. An indirect cooling system might also be used advantageously for cooling the entire absorber. Other forms of cooling systems may also be employed as for example that disclosed in the copending application of R. S. Nelson, Serial No. 527,146 filed April 2, 1931. It will be unnecessary to describe these cooling systems in detail since they are now well known to those skilled in the art, Patent No. 389,674 having issued in Great Britain upon March 23, 1933 on an application corresponding to that of Nelson's U. S. application 539,450 and Patent 382,867 having issued in England on November 3, 1932 on an application corresponding to the Nelson U. S. application Serial No. 527,146.

It will be noted that in Figure 2 the gases and liquids flow in parallel in the lower compartment 22, while they flow in the opposite directions or in counter flow in the upper compartment 21. Figure 3 illustrates another form of the invention in which the liquid and gases flow in somewhat the same way as they do in Figure 2, but in which a different form of construction is employed. Thus, the absorber shown in Figure 3 consists of two main parts designated 41 and 42 respectively. The upper section 41 consists of three horizontally disposed pieces of pipe as indicated at 43, 44 and 45, each of which are provided with a large number of heat radiating fins as indicated at 46. The right hand ends (as shown in this figure) of the conduits 43 and 44 are joined by a short vertical section of pipe 47 and the left hand ends of the pipes 44 and 45 are joined by a similar piece of pipe 48. A tortuous path for the flow of fluids through the section 41 of the absorber is thus provived. The right hand end of the pipe 45 is joined to a small vessel 49 which acts as a sump. Gases are supplied to the vessel 49 by a vertical conduit 50 connected to the bottom pipe of the lower section 42 of the absorber. Liquid is drained out of the vessel 49 by means of a small U-shaped conduit 51 which is connected to a vessel similar to that shown at 49 and which is connected to the upper pipe 52 of the lower section 42 as shown at 53.

The lower section 42 of the absorber is made up of a number of horizontally disposed pipes as indicated at 53, 54, 55, 56, 57 joined together by short vertical sections of pipe 58, 59, 60, 61, each short vertical section of pipe discharging into a small vessel as indicated at 52, 62, 63, 64. It will be noted that the short vertical sections of pipe 58, 59, 60 and 61 together with their cooperating vessels 52, 62, 63 and 64 are alternated on the right and left hand sides of the conduits 53 to 57 inclusive so as to provide a tortuous path for the flow of gases through the entire absorber section 42.

In the upper section 41 of this absorber, the gases and the liquid pass in counter flow. In the lower section 42, the gases are not in parallel flow, although both are passing downwardly as in the compartment 22 of Fig. 2. In Figure 3, liquid supplied to the lower absorber section 42 by means of the conduit 51 does not flow in parallel with the gases in so far as the individual pipes 53 to 57 inclusive are concerned. In the conduit 53 the gases which are supplied to the absorber through the conduit 65 pass from left to right while the absorption liquid flows from right to left. The liquid is discharged from the conduit 53 by means of a small tube 66 which is connected to the small vessel 62 associated with the next lower pipe 54. In the same way, the gases pass from right to left in the conduit 54 while the absorption liquid flows from left to right and discharges through the small tube 67 into the vessel 63 associated with the pipe 55. Similarly the tube 68 conveys absorption liquid from the pipe 55 to the vessel 64 and the tube 69 conveys absorption liquid from the pipe 56 to the pipe 57, the left hand end of which is connected to the conduit 14 which conveys absorption liquid away from the absorber. Each of the small tubes 66 and 69 inclusive may be provided with heat radiating fins as shown at 70 to aid in the discharge of heat from the absorber.

While the arrangement of Figure 3 has the advantage of counter flow in the individual pipes of the section 42, the arrangement is somewhat complicated and the principal features of the invention may be utilized by a simpler construction such as is indicated in Figure 4, although in some cases, this arrangement will probably be found to be not quite so efficient.

In Figure 4 the absorber is shown as consisting of two sections indicated at 71 and 72. The section 71 is similar in all respects to the section 41 of Figure 3 consisting as it does of a number of horizontal pipes as indicated at 73, 74, 75, 76 joined alternately by short vertical sections 77, 78 and 79. Each horizontal pipe is provided with a number of heat radiating fins as indicated at 80. The left hand end of the lower pipe 76 is connected to a small vessel 81 which acts as a sump. Gas is supplied to the vessel 81 by means of the vertical gas pipe 82 connected to the bottom of the lower section 72 of the absorber and liquid is drained out of the vessel 81 by means of a small conduit 83 which is connected to the top pipe of the lower section 72.

The lower section 72 of the absorber differs from the section 42 of Fig. 3 in that it is made up of a number of pipes horizontally disposed as indicated at 84, 85, 86 and 87, the alternate ends of these pipes being joined by short vertical pieces of pipe 88, 89 and 90. Each of the horizontal pipes 84, 85, 86 and 87 is provided with a number of heat radiating fins as indicated at 91.

In the arrangement of Figure 4 absorption liquid is supplied to the absorber through the conduit 13 and trickles downwardly through the pipes 73, 74, 75 and 76 into the vessel 81 from which it is conveyed by the conduit 83 into the pipe 84. It then trickles downwardly through the section 72 through the pipes 85, 86 and 87 and is conveyed away from the absorber through the conduit 14. Inert gas laden with refrigerant gas is supplied to the absorber through the gas conduit 17. The gases pass downwardly, in parallel flow with the liquid through the conduits 84, 85, 86 and 87 and then pass upwardly through the conduit 82 into the vessel 81 and flow in counter-flow through the upper section 71 of the absorber through the conduits 76, 75, 74 and 73 leaving the absorber through the gas conduit 16.

In Figures 2, 3 and 4, the arrows indicate the direction of flow of the gases through the absorber.

It will thus be seen that various forms of an absorber having two main parts have been illustrated and that in these absorbers the gases coming from the evaporator of the refrigerating system first meet the absorption liquid in the upper part of the lower section of the absorber and then passing downward through the lower part of this section where they again come in contact with the absorption liquid at a lower temperature. The gases then pass upwardly and in counter-flow with the liquid in the upper section of the absorber and just before leaving the absorber come in contact with weakest absorption liquid. Due to the peculiar manner in which the fluids circulate through the absorber, effective absorption may take place so that the solution leaving the absorber is quite concentrated while the inert gas leaving the absorber is effectively stripped of the refrigerant vapor. At the same time, a construction is provided which permits of compact assembly and does not require an excessive amount of heat radiating surface.

While only three embodiments of the invention have been shown and described herein it is obvious that many changes may be made without departing from the spirit of the invention or the scope of the annexed claims.

I claim:

1. In an absorption refrigerating system, an absorber consisting of two sections spaced vertically from one another, means for causing an absorption liquid to flow downwardly through said sections, means for supplying a mixture of inert gas and refrigerant gas to the upper part of the lower section and for causing the gases to flow downwardly through said lower section and then upwardly through the upper section.

2. In an absorption refrigerating system, an absorber consisting of two sections spaced vertically from one another, means for causing an absorption liquid to flow downwardly through said sections, means for supplying a mixture of inert gas and refrigerant gas to the upper part of the lower section and for causing the gases to flow downwardly through said lower section and then upwardly through the upper section and means for cooling the sections of the absorber individually.

3. In an absorption refrigerating system, an absorber consisting of two sections spaced vertically from one another, means for causing an absorption liquid to flow downwardly through said sections, means for supplying a mixture of inert gas and refrigerant gas to the upper part of the lower section and for causing the gases to flow downwardly through said lower section the two sections being formed by dividing a single vertically disposed cylinder into compartments.

4. In an absorption refrigerating system, an absorber consisting of two sections spaced vertically from one another, means for causing an absorption liquid to flow downwardly through said sections, means for supplying a mixture of inert gas and refrigerant gas to the upper part of the lower section and for causing the gases to flow downwardly through said lower section and then upwardly through the upper section each of the two sections being formed by providing a plurality of horizontally disposed pipes to form a tortuous path for the flow of gases therethrough.

5. In an absorption refrigerating system, an absorber consisting of two sections spaced vertically from one another, means for causing an absorption liquid to flow downwardly through said sections, means for supplying a mixture of inert gas and refrigerant gas to the upper part of the lower section and for causing the gases to flow downwardly through said lower section and then upwardly through the upper section each of the two sections being formed by providing a plurality of horizontally disposed pipes to form a tortuous path for the flow of gases therethrough the gases and liquid flowing in parallel flow in the lower section and in counter-flow in the upper section.

6. In an absorption refrigerating system, an absorber consisting of two sections spaced vertically from one another, means for causing an absorption liquid to flow downwardly through said sections, means for supplying a mixture of inert gas and refrigerant gas to the upper part of the lower section and for causing the gases to flow downwardly through said lower section and then upwardly through the upper section each of the two sections being formed by providing a plurality of horizontally disposed pipes to form a tortuous path for the flow of gases therethrough the gases and liquids both flowing downwardly in the lower section but in counter-flow in the individual pipes thereof.

7. In an absorption refrigerating system, an absorber having an upper and a lower part, means for causing an absorption liquid to flow through the upper part and then through the lower part and means for causing the gas to be absorbed to flow first through the lower part in parallel with the absorption liquid and then through the upper part in counter-flow with the liquid.

8. An absorber adapted for use in an absorption refrigerating system comprising a vertically disposed cylinder, a partition in said cylinder for dividing the same into an upper and a lower compartment, baffle plates in each of said compartments, a conduit for supplying absorption liquid to the upper compartment, a conduit for conveying absorption liquid from the upper compartment to the lower compartment and a conduit for conveying absorption liquid away from the lower compartment, a gas conduit for supplying inert gas, laden with a gas to be absorbed to the top part of the lower compartment, a gas conduit located in the lower compartment for passing the gases from the lower part of the lower compartment to the lower part of the upper compartment and a gas conduit for conveying the inert gas away from the top part of the upper compartment.

9. An absorber adapted for use in an absorption refrigerating system having two sections arranged one above the other, the upper section consisting of a conduit formed to provide a tortuous path for the flow of fluids therein and the lower section including a plurality of pipes and a plurality of vessels connected thereto, means for supplying an absorption liquid to the upper section and for causing it to flow downwardly through that section and the lower section, means for supplying inert gas and gas to be absorbed to the top portion of the lower section and for causing the gases to flow downwardly through that section but in counter-flow to the flow of liquid in the individual pipes thereof, means for conveying the gases from the bottom portion of the lower section to the bottom portion of the upper section and for causing the gases to flow upwardly therethrough in counter-flow to the flow of absorption liquid therein.

10. An absorber adapted for use in an absorption refrigerating system having two sections each section including a conduit so formed as to provide a tortuous path for the flow of fluids therethrough and with a large horizontal area, means for causing absorption liquid to flow downwardly through both sections and means for causing an inert gas and a gas to be absorbed to flow downwardly in one section and then upwardly in counter-flow to the flow of absorption liquid in the other section.

11. An absorber adapted for use in an absorption refrigerating system having two sections, each section including a plurality of horizontally disposed conduits so connected as to provide a tortuous path for the flow of fluids therethrough, means for causing an absorption liquid to flow downwardly through said sections and means for causing a gas to be absorbed to flow downwardly in parallel flow with the liquid in one of said sections and then upwardly in counter-flow with the liquid in the other of said sections.

RUDOLPH S. NELSON.